United States Patent
Nishikawa et al.

[11] Patent Number: 5,153,788
[45] Date of Patent: Oct. 6, 1992

[54] METHOD OF RECORDING AND DETECTING SERVO INFORMATION FOR POSITIONING MAGNETIC HEAD

[75] Inventors: Keiichi Nishikawa; Shigemasa Yoshida, both of Kamakura, Japan

[73] Assignee: Mitsubishi Denki Kabushiki Kaisha, Japan

[21] Appl. No.: 501,050

[22] Filed: Mar. 28, 1990

[30] Foreign Application Priority Data

Mar. 29, 1989 [JP] Japan .................................... 1-76986

[51] Int. Cl.⁵ .......................... G11B 5/596; G11B 5/09
[52] U.S. Cl. ..................................... 360/77.08; 360/51
[58] Field of Search .................... 360/51, 77.01, 77.02, 360/77.05, 77.07, 77.08

[56] References Cited

U.S. PATENT DOCUMENTS

| | | | |
|---|---|---|---|
| 4,424,543 | 1/1984 | Lewis et al. | 360/77.08 |
| 4,825,310 | 4/1989 | Song | 360/77.08 |
| 4,910,617 | 3/1990 | Brunnett et al. | 360/77.08 |

FOREIGN PATENT DOCUMENTS 58-501644 9/1983 Japan .
63-100675 5/1988 Japan .

OTHER PUBLICATIONS

Mini-Micro Systems, "Embedded servo comes to 5¼-in. cartridge disk" Pollock, Feb. 1988, pp. 219–222, 225, 226.

Primary Examiner—Jerry Smith
Assistant Examiner—Steven R. Garland
Attorney, Agent, or Firm—Wolf, Greenfield & Sacks

[57] ABSTRACT

Magnetization inversion data at different frequencies are recorded as part of servo information before and after an erasing gap between a data sector and a servo sector, the time interval between pulses read out from these magnetization inversion data is detected using a gap detection timer, and a timing for reading out servo information is obtained according to the result of detection by the gap detection timer.

10 Claims, 8 Drawing Sheets

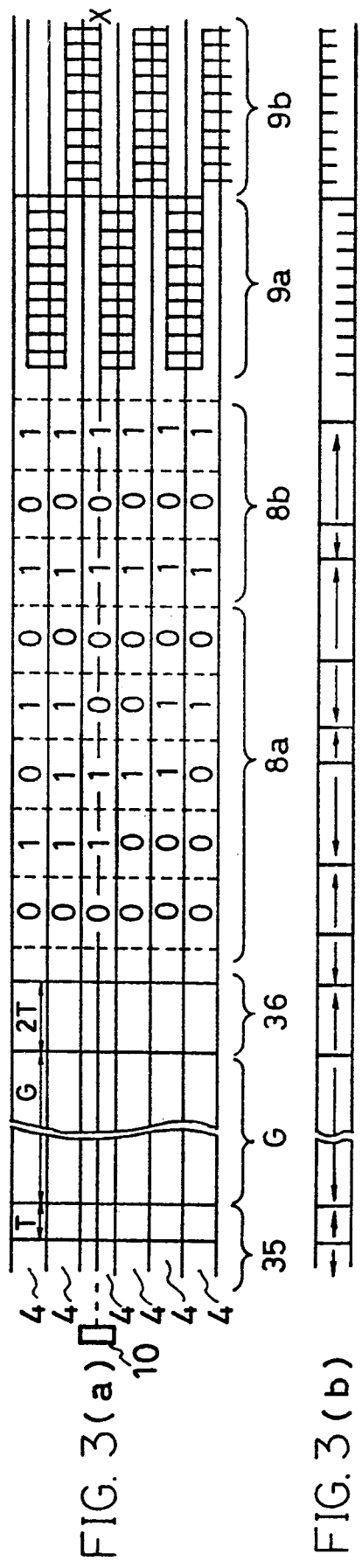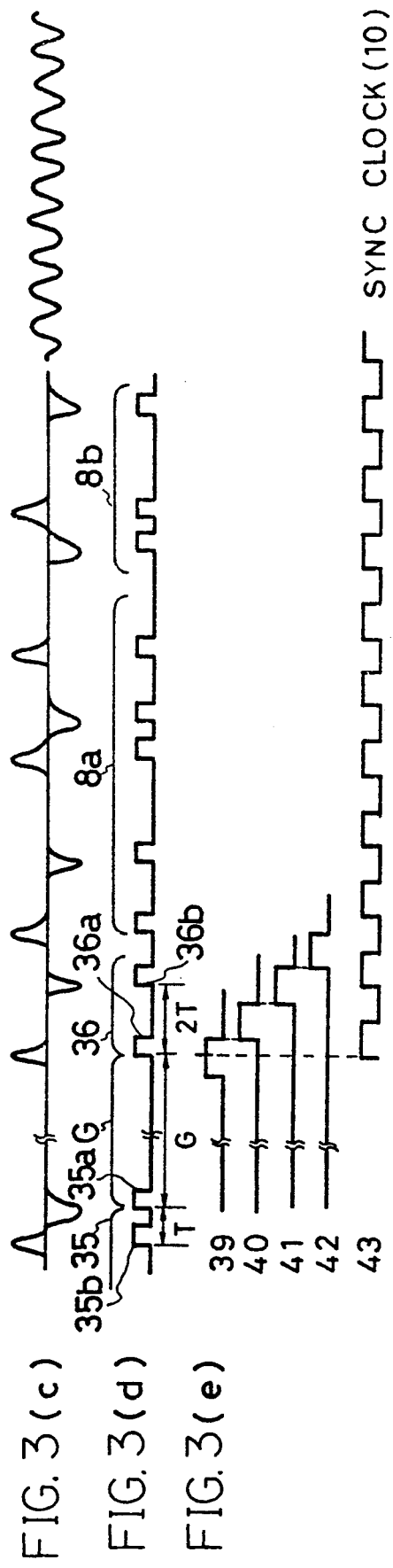

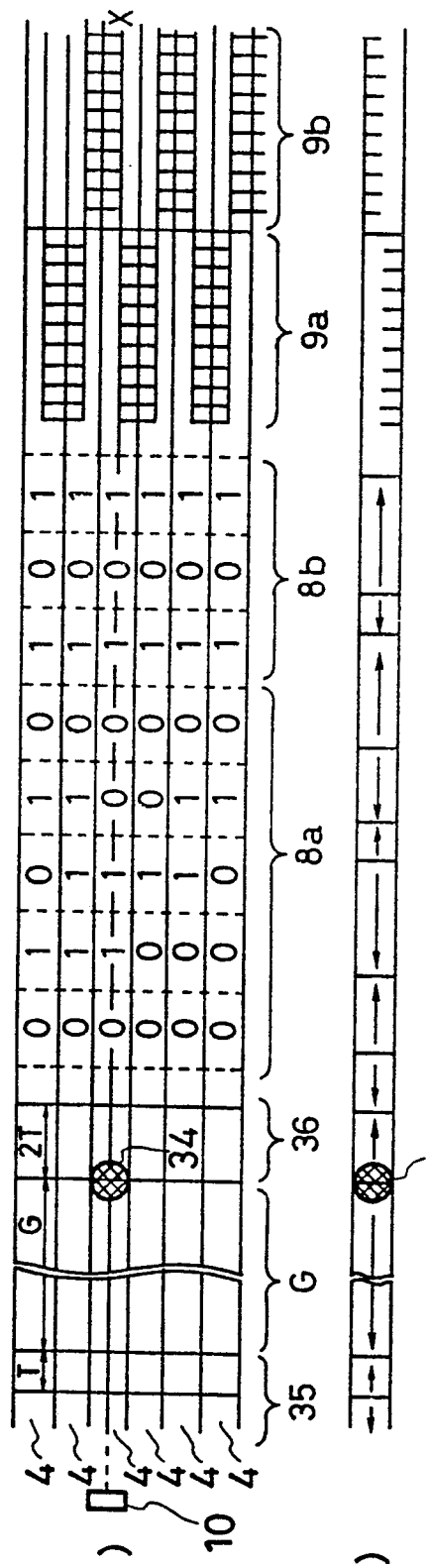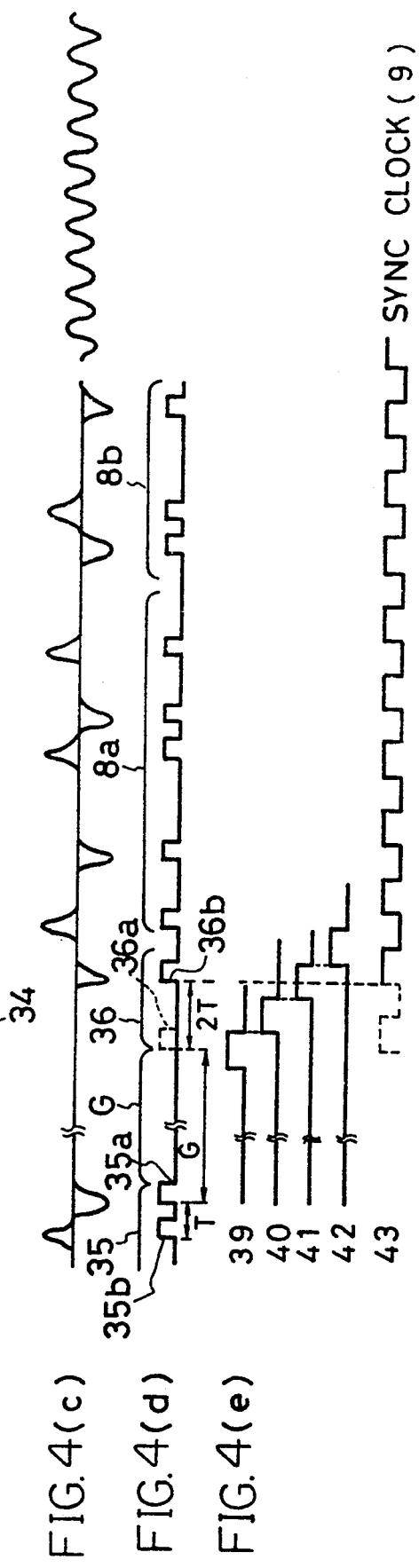

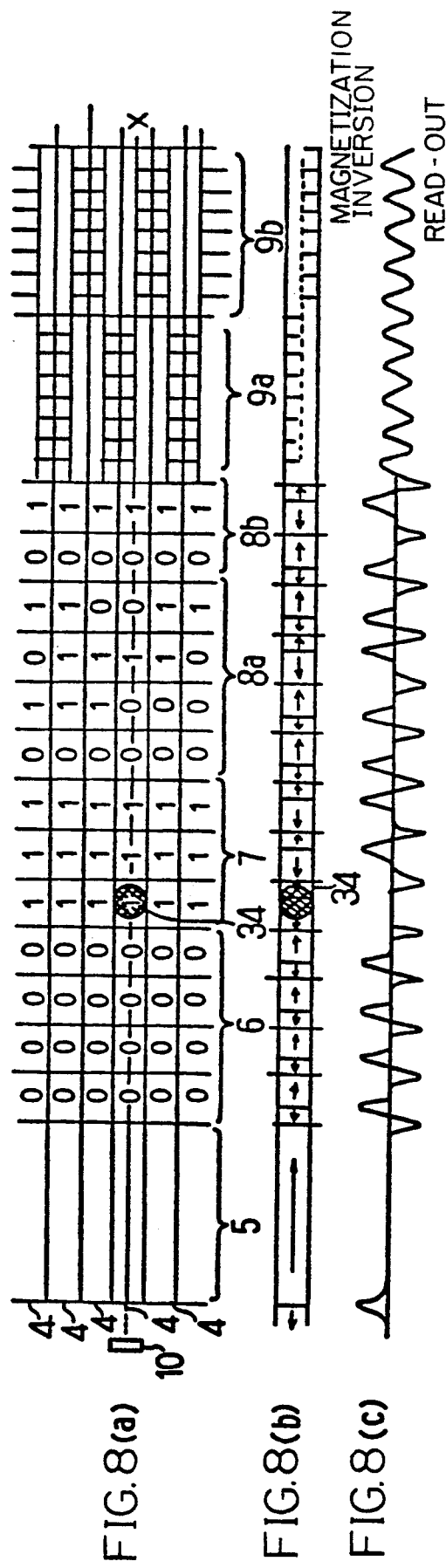

METHOD OF RECORDING AND DETECTING SERVO INFORMATION FOR POSITIONING MAGNETIC HEAD

BACKGROUND OF THE INVENTION

1. Field of the Invention

This invention relates to a method of recording and detecting servo information for positioning a magnetic head in a magnetic disk apparatus for recording and reproducing data.

2. Description of the Prior Art

In a magnetic disk apparatus or the like, a plurality of tracks are provided concentrically, and a magnetic head is positioned to correspond to a given track among these tracks for writing or reading data. With most conventional magnetic disk apparatuses, an exclusive data recording area and exclusive servo area for positioning information for the magnetic head are provided. Positioning information is preliminarily written on the exclusive area for servo positioning the magnetic head.

With the recent trend for smaller track pitch, a system is adopted, in which information for positioning the magnetic head is preliminarily written in the same recording area as for recording data, the positioning information for effecting the positioning according to servo information read out by the magnetic head itself, which reads and writes data. This method requires a technique of effecting the positioning of the magnetic head by separating servo information from data read out from the recording area. Such a technique is disclosed in, for instance, Japanese Patent Publication 58-501644 and Japanese Patent Publication 63-100675.

This prior art technique will now be described with reference to the drawings. FIG. 5 is a view showing a recording medium with data sectors and servo sectors provided alternately on the same area. Reference numeral 1 designates recording medium, 2 data sectors on medium 1 for recording data, and 3 servo sectors on medium 1 for recording servo information.

FIG. 6(a) is a view showing, to an enlarged scale, part of servo sector 3 shown in FIG. 5. The showing is simplified to facilitate the explanation of an embodiment disclosed in the Japanese Patent Publication 58-501644 noted above. Referring to the Figure, reference numeral 4 designates servo tracks, each of which consists of erasing gap 5 without magnetization inversion for a predetermined interval, and preamble, sector mark, track data and burst sections 6 to 9 provided in the mentioned order subsequent to erasing gap 5. Track data section 8 consists of track address 8a and clock check code 8b, and burst section 9 consists of A and B bursts 9a and 9b. Reference numeral 10 designates the magnetic head. Designated at X is the orbit of head 10. FIG. 6(b) shows magnetic inversion of orbit x of head 10 on the recording medium, and FIG. 6(c) shows a read-out signal when orbit X is traced by head 10.

FIG. 7 is a block diagram showing a prior art circuit for separating servo information. Magnetic head 10 scans recording medium 1 to read out magnetization inversion written on medium 1. A signal from head 10 is amplified by amplifier 11, which provides an output to additional amplifiers 12 and 13 and also to peak detector 14. Amplifiers 11 to 13 merely amplitude amplify the signal from head 10 for obtaining signal levels suitable for a subsequent electronic circuit. Peak detector 14 produces pulses corresponding to positive and negative peaks of the signal from head 10. The pulse output of peak detector 14 is supplied to data separator 15. Data separator 15 decodes the output of peak detector 14 to be "0" or "1" according to reading the code of servo information. The construction of data separator 15 thus depends on the recording code of servo information. Generally, data separator 15 requires a clock synchronized to the recording code of servo information. The synchronized clock is obtained by utilizing the preamble with consequent "0"s. The recording code can be readily decoded to "1" and "0" according to the synchronized clock and output of peak detector 14.

The output of data separator 15 consists of a series of data and is supplied to the input side of shift register 16. Data separator 15 also generates a synchronized clock, which is supplied as the clock input to 6-bit shift register 16 and is also supplied to 6-clock counter 17.

The output of amplifier 12 is sources to erasing gap detector 18, which is a circuit for starting a servo information recovery process. More specifically, by detecting that no signal is received from magnetic head 10, the erasing gap detector detects the erasing gap 5, and in response thereto generates a logic level "1" on line 19 indicating the "presence of erasing gap". The signal on line 19 is supplied, together with a "timer enable" signal supplied from timer 20 to line 21, to the input side of AND gate 22. If both the inputs to AND gate 22 are high, an "erasing gap enable" signal is generated on line 23 and used to operate sector mark decoder 24. Sector mark decoder 24 is connected to the output of shift register 16 such as to monitor the first 3 bits of data. Thus, sector mark decoder 24 provides a "start" pulse to line 25 when and only when there is an "erasing gap enable" signal on line 23 and the first three bits of shift register 16 are "111". The "start" pulse on line 25 is supplied to 6-clock counter 17. Erasing gap detector 18 consists of a general-purpose peak detector and a counter for checking whether there is a signal from head 10. Sector mark decoder 24 consists of a simple three-input AND gate for detecting three "1"s in shift register 16. When a "start" pulse is provided to line 25, 6-clock counter 17 counts six synchronized clock pulses from data separator 15, and at the time of counting it generates "an-end-of-counting" signal to line 26. The signal on line 26 is supplied to three-input AND gate 27. To AND gate 27 are supplied a "timer enable" signal on line 21 and the output of clock check decoder 28. Clock check decoder 28 is a similar circuit to sector mark decoder 24 and connected to the output side of shift register 16 such as to monitor the newest 2-bit data. More specifically, the output of clock check decoder 28 is high when shift register 16 receives track data 8 subsequent to "111" of sector mark 7 and also receives succeeding 2-bit clock check code 8b of track data 8. Thus, when three inputs to AND gate 27 appear simultaneously, this means that track data 8 is loaded accurately, and thus a "track address load" signal is generated on line 29. Microprocessor 30 reads out track address 8a from the output of shift register 16 as soon as it receives a "track address load" signal. The "track address load" signal is also coupled to a start terminal of timer 20, and timer 20 has several functions. When timer 20 receives a "track address load" signal, it supplies timing signal to each of sample/hold circuits 31 and 32 for A and B bursts 9a and 9b. The outputs of sample/hold circuits 31 and 32 are supplied to a servo circuit (not shown) and used for the positioning of the magnetic head. Timer 20 provides the "timer enable" signal noted before by determining a timing, at which next servo sector 2 appears. Further, it determines time until a "track address load" signal is received since the provision of a "timer enable" signal. If the determined time differs greatly from a predetermined time, it generates a "failure" signal on line 33 to prevent erroneous processing of the servo sector.

The track address and sample/hold signals of A and B bursts 9a and 9b, which are read out accurately as described above, are supplied to a servo circuit (not shown) for ordinary servo control.

According to the Japanese Patent Publication 58-501644 noted above, a gray code is written repeatedly three times in track address 8a, and 4 bits are set as clock check code 8b to minimize erroneous reading of track address 8a due to a defect in the medium.

However, if there is medium defect 34 in sector mark 7 as shown in FIG. 8, sector mark decoder 24 can not provide a "start" pulse, thus resulting in a "failure" state. More specifically, any conventional servo data includes a pulse for timing, and if such pulse fails to be detected due to a medium defect or like cause, a series of servo data becomes defective.

SUMMARY OF THE INVENTION

The present invention has been intended in order to solve the problems discussed above, and its object is to provide a method of recording and detecting servo information for positioning a magnetic head, which permits accurately reading out servo information even if servo information has drop-out of a bit due to a medium defect.

According to the invention, there is provided a method of recording and detecting servo information, which comprises the steps of alternately providing data sectors for recording data on the recording medium and servo sectors for recording servo information for positioning the magnetic head, recording magnetization inversion data at different frequencies as part of the servo information before and after erasing the gap section between the data sector and the servo sector, detecting the interval between pulses read out from the two, i.e., preceding and successing, magnetization inversion data with the gap detection timer and obtaining a timing for reading out the servo information from the detection result from the gap detection timer.

BRIEF DESCRIPTION OF THE DRAWINGS

FIG. 3(a) to 3(e) are views for explaining the operation of this embodiment;

FIGS. 4(a) to 4(e) are views for explaining the operation of the embodiment in case when there is a medium defect;

FIGS. 8(a) to 8(c) are views for explaining the circuit shown in FIG. 7 when there is medium defect on the sector mark.

DESCRIPTION OF THE PREFERRED EMBODIMENT

Figure 1:
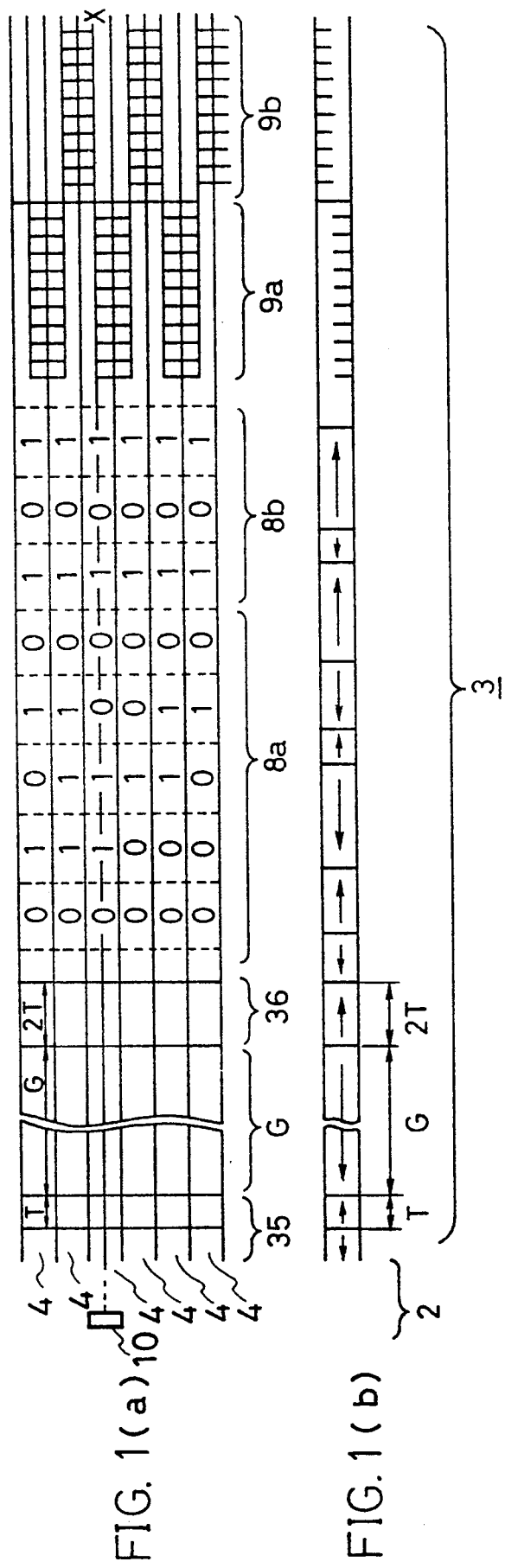
FIG. 1(a) is a view showing a pattern on a recording medium for explaining an embodiment of the method of recording and detecting servo information for positioning magnetic head according to the invention.
FIG. 1(b) is a view showing magnetization inversion data on the recording medium with respect to an orbit of a magnetic head shown in FIG. 1(a)
Figure 2:
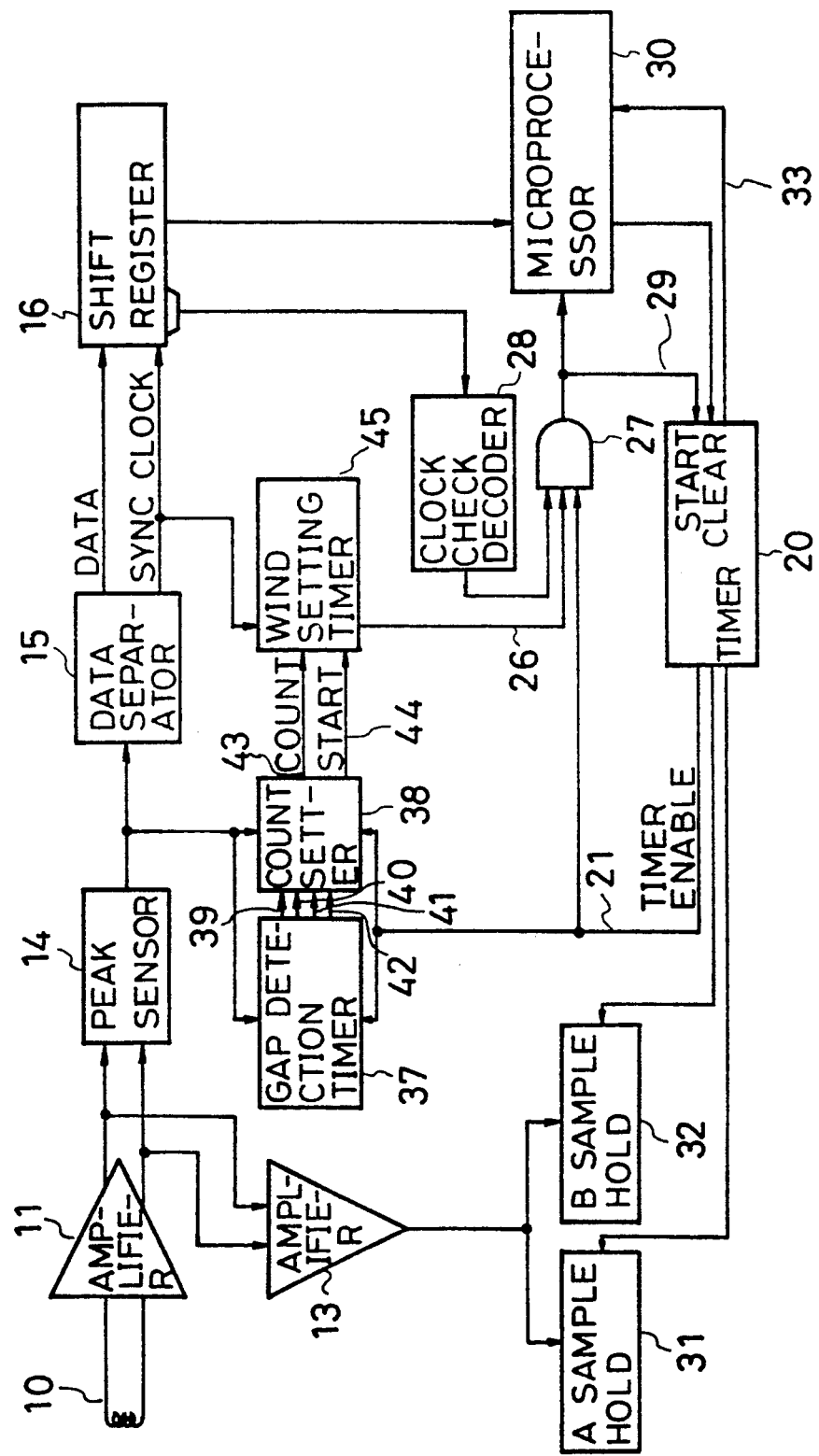
FIG. 2 is a block diagram showing a circuit for separating and detecting servo information in the same embodiment.
Figure 5:
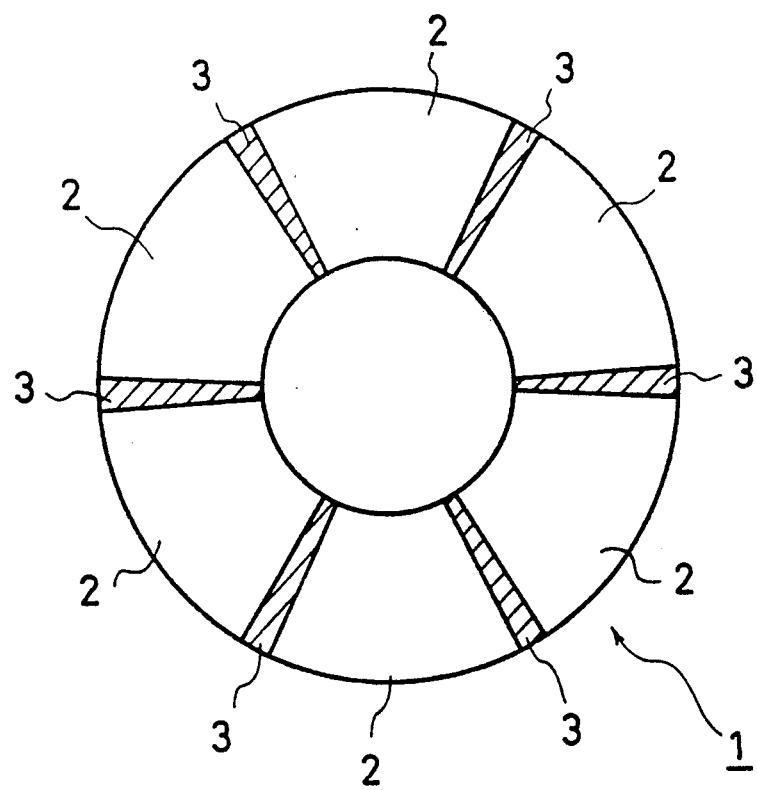
FIG. 5 is a view showing a recording medium with alternately provided data and servo sectors.
Figure 6:
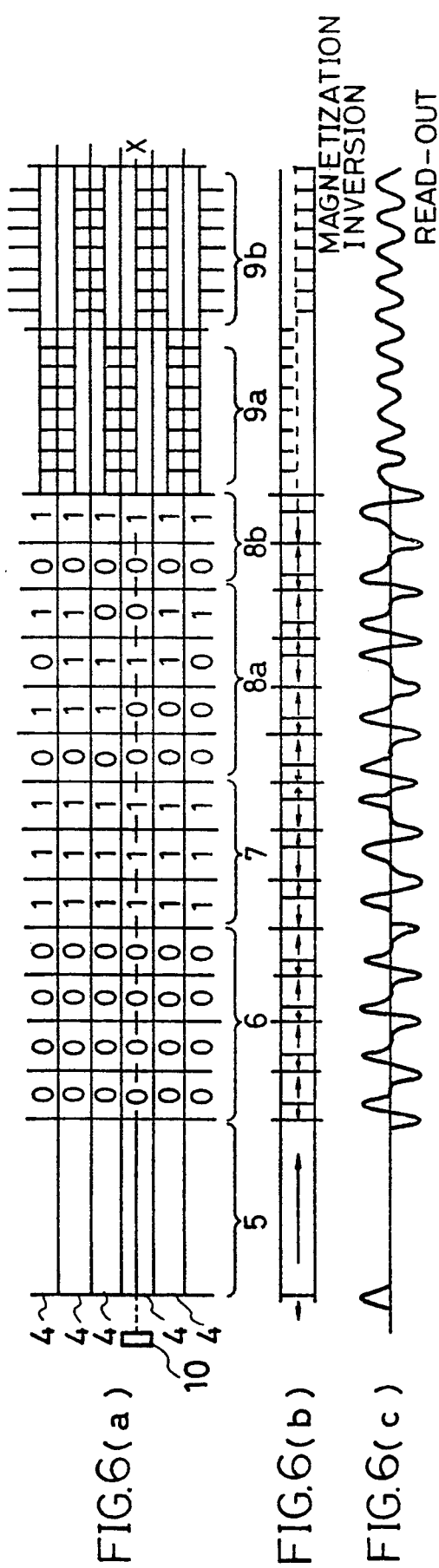
FIG. 6(a) is a view showing a pattern on a recording medium for explaining a prior art method of recording and detecting servo information.
FIG. 6(b) is a view showing magnetic inversion data on the recording medium with respect to an orbit of a magnetic head shown in FIG. 6(a)
FIG. 6(c) is a view showing a read-out signal when the orbit is treated by the magnetic head shown in FIG. 6(a)
Figure 7:
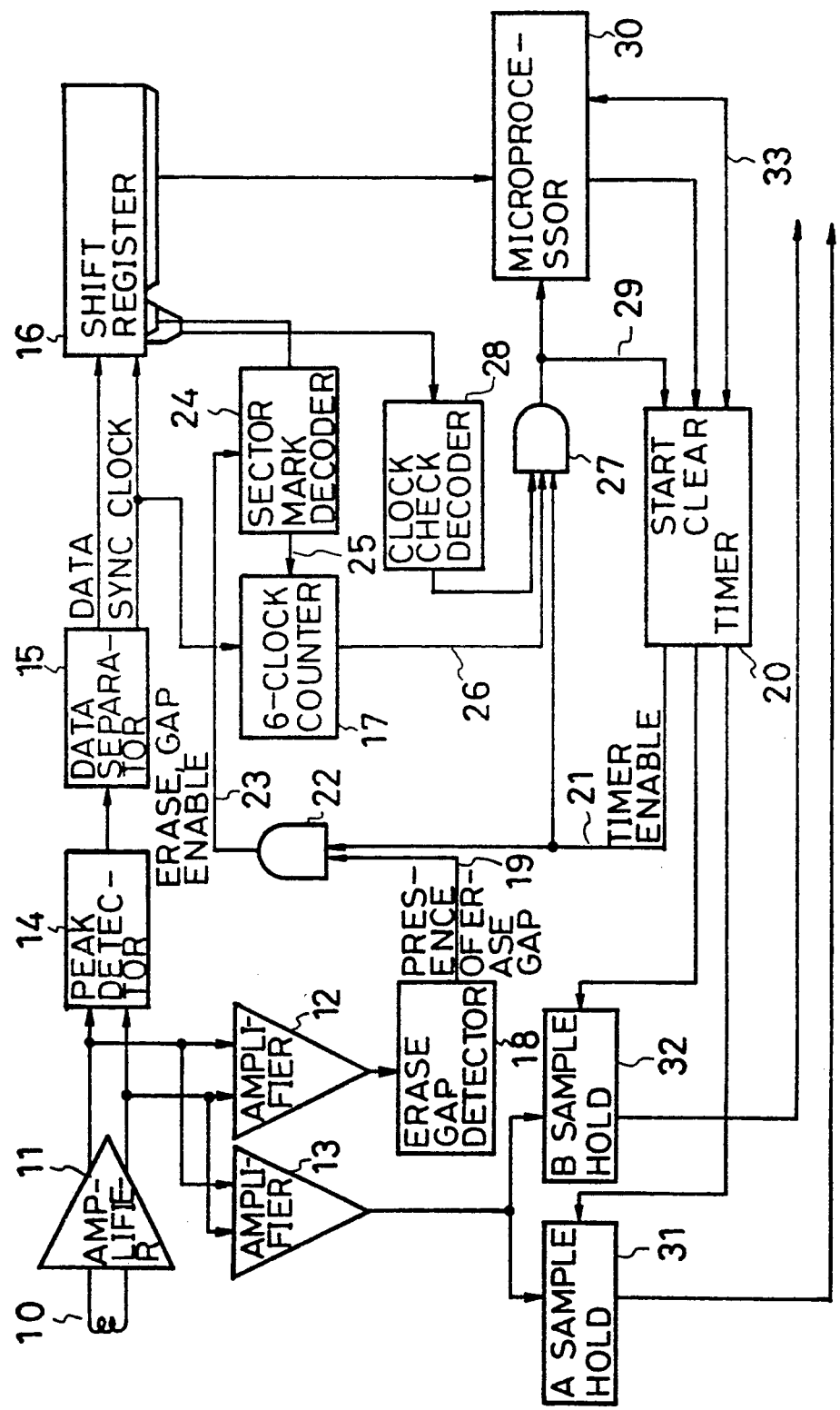
FIG. 7 is a block diagram showing a prior art circuit for separating and detecting servo information.

FIG. 1(a) is a view showing a pattern on recording medium (i.e., magnetic disk) 1 with servo information written by an embodiment of the method of recording and detecting servo information according to the invention. FIG. 1(b) is a view showing magnetization inversion data on recording medium 1 with respect to orbit X of magnetic head 10 shown in FIG. 1(a). Referring to FIGS. 1(a) and 1(b), elements like those shown in FIGS. 6(a) to 6(c) are designated by like reference numerals and symbols, and their description is omitted. Referring to FIGS. 1(a) and 1(b), reference numeral 35 designates a pre-gap pulse based on magnetization inversion data recorded prior to erasing gap G. Pre-gap pulse 35 has time interval T. Reference numeral 36 designates a post-gap pulse based on magnetic inversion data recorded subsequent to erasing gap G. Post-gap pulse 36 has a time interval equal to 2T. Reference numeral 8 designates the track data section, which consists of track address 8a and clock code 8b, and 9 designates the burst section, which consists of A and B bursts 9a and 9b. The arrangement of servo sector including servo information is similar to that in the prior art as shown in FIG. 5. FIG. 2 is a block diagram showing a servo information separating/detecting circuit in this embodiment. Referring to FIG. 2, a signal from magnetic head 10 is amplified by amplifier 11, and the output thereof is supplied to additional amplifier 13 and peak detector 14. Amplifiers 11 and 13 merely amplify the amplitude of the signal from head 10 for obtaining a level suited for a subsequent electronic circuit. Peak detector 14 generates pulses at positive and negative peaks of the signal from head 10. The pulse output of peak detector 14 is supplied to data separator 15, gap detection timer 37 and count setter 38. Data separator 15 can decode the output of peak detector 14 to "0" or "1" according to recording code of servo information. For this reason, the construction of data separator 15 depends on the recording code of servo information. Generally, however, data separator 15 requires a clock synchronized to the recording code of servo information. With recent stabilization of the rotational number of the disk in magnetic disk systems and improvement in phase synchronization circuits, there is provided a method of obtaining a sufficiently stable synchronized clock by merely causing re-start of clock at a timing of a single pulse. In the present circuit, the post-gap pulse is utilized to obtain a synchronized clock. The recording code can be readily decoded to "1" and "0" according to the synchronized clock and output of detector 14. The output of data separator 15 consists of a series of data and is supplied to the input side of 10-bit shift register 16. Data separator 15 further generates a synchronized clock, which is supplied as a shift clock to a clock input terminal of 10-bit shift register 16 and is also supplied to window setting timer 45.

Gap detection timer 37 measures the lapse of time from the rising of the last input pre-gap pulse (see FIG. 3). Denoting the time interval of the pre-gap pulse by T and time of erasing gap section G by G, if measured time t elapsed is $G \leq t < G+T$, gap detection timer 37 provides data "1" to line 39. If t is $G+T \leq t < G+2T$, it provides data "1" to line 40. If t is $G+2T \leq t < G+3T$, it provides data "1" to line 41. If t is $G+3T \leq t < G+4T$, it provides data "1" to line 42.

Count setter 38 detects the time elapsed from the last pre-gap pulse 35 until the appearance of the post-gap pulse 36. That is, it detects one of lines 39 to 42, on which "1" prevails when post-gap pulse 36 appears, and according to its input timing it provides a count setting value to line 43 and a "timer start" signal to line 44.

Window setting timer 45 starts the counting of synchronized clock pulses according to a "timer start" signal on line 44, and when the count becomes equal to the count presetting value on line 43, it provides an "end-of-counting" signal to line 26. The signal on line 26 is supplied to three-input AND gate 27, to which are also supplied a "timer enable" signal on line 21 and the output signal from clock check decoder 28. Clock check decoder 28 is connected to the output side of shift register 16 such as to monitor the latest 3-bit data input, and when 2 bits of data are identical with predetermined data, it provides an "identity" data. subsequent to post-gap pulse 36, track address 8a and the 3-bit clock check code 8b are respectively supplied to shift register 16. When clock check decoder 28 detects the 3-bit clock check code in the latest 3-bits of shift register 16, its output goes high. Thus, simultaneous three inputs to AND gate 27 mean that track data 8 is accurately loaded, and in consequence a "track address load" signal is provided to line 29. As soon as microprocessor 30 receives a "track address load" signal, it reads out track address 8a from the output of shift register 16. The "track address load" signal is also supplied to a start terminal of timer 20, and timer 20 has several functions. As a first function, when timer 20 receives a "track address load" signal, it provides a timing signal to each of sample/hold circuits 31 and 32 for A and B bursts 9a and 9b. The outputs of sample/hold circuits 31 and 32 are supplied to a servo circuit (not shown) and used for positioning a magnetic head. Timer 20 also provides a "timer enable" signal by determining the timing, at which the next servo sector 2 appears. Further, it determines the time until a "track address load" signal is received since the provision of a "timer enable" signal. If the determined time difference differs greatly from a predetermined time, it generates a "failure" signal on line 33 to prevent erroneous processing of the servo sector.

FIGS. 3(a) to 3(e) show servo information for a plurality of tracks, waveform of data read out when orbit X is traced by head 10 and timing of signals appearing in the circuit of FIG. 2. When time G has been passed since the rising of last pre-gap pulse 35, signal "1" appears on line 39, and the first rising of post-gap pulse 36 is loaded. This means that both pre- and post-gap pulses 35a and 36a are accurately loaded. Consequently, a count setting value corresponding to 10 synchronized clock pulses is provided.

FIGS. 4(a) to 4(e) are views illustrating operation in case of the failure of loading of the first rising of post-gap pulse 36a due to medium defect 34. The first rising of post-gap pulse 36b is loaded after lapse of time $G+2T$ from the appearance of pre-gap pulse 35a. Since this incidence is a drop-out of post-gap pulse 36a, the count setting value corresponds to 9 synchronized clock pulses, and a start signal is provided after a delay of one clock pulse to maintain the matching of timing. A drop-out of pre-gap pulse 35a may be similarly determined, and it is possible to generate a "track address load" signal at an accurate timing.

While in the above embodiment the time interval of pre-gap pulse 35 is chosen to be T and that of post-gap pulse 36 to be 2T, it is also possible to set T and 3T as these time intervals. Further, while a gray code is used for track address 8a, it is also possible to repeat the gray code three times or use other codes.

As has been described in the foregoing, according to the invention, magnetization inversion data at different frequencies are recorded as part of servo information before and after an erasing gap between data and servo sectors. The time interval between pulses read out from the magnetization inversion data before and after the erasing gap is detected using a gap detection timer, and a timing for reading out servo information is obtained according to the result of detection. Thus, it is possible to determine whether all normal pulses are read out from the servo sectors, or if one pulse is missing due to such cause as a defect in the recording medium, the missing pulse can be discriminated, thus permitting track data subsequent to the gap to be read out accurately. This means that even if there is a drop-out of a bit in servo information due to a medium defect, servo information can be accurately read out. A highly reliable magnetic disk apparatus thus can be provided.

What is claimed is:

1. A method of recording and detecting servo information for positioning a magnetic head, comprising the steps of:
    alternately providing data sectors for recording data and servo sectors for recording servo information for positioning the head on a recording medium,
    recording detection information between said data and servo sectors, said detection information including preceding magnetization inversion data, succeeding magnetization inversion data, and an erasing gap between said preceding and succeeding magnetization inversion data;
    detecting a time interval between a pulse read out from said preceding magnetization inversion data and a pulse read out from said succeeding magnetization inversion data, said detection being accomplished by using a gap detection timer; and
    obtaining a timing for reading out said servo information from the result of detection by said gap detection timer.

2. The method according to claim 1, wherein obtaining said timing is providing a start signal and a count to a count setter.

3. The method according to claim 1, wherein said preceding and succeeding magnetization inversion data respectively include start and end signals indicative of their start and end.

4. The method according to claim 3, wherein said gap detection timer starts measurement of time from the appearance of said end signal of said preceding magnetization inversion data and effects time setting for obtaining said timing every time a time period T corresponding to the time interval of said preceding magnetization inversion data is passed after lapse of a time interval corresponding to the duration of said erasing gap.

5. The method according to claim 4. wherein said timing is started selectively by said start or end signal of said succeeding magnetization inversion data.

6. The method according to claim 1, wherein the preceding and succeeding magnetization data each has a time interval, the time interval of said succeeding magnetization inversion data being nT (n=2, 3, ...) where T is the time interval of said preceding magnetization inversion data.

7. The method according to claim 1, wherein a track address of a servo track provided in each said servo sector is provided subsequent to said succeeding magnetization inversion data.

8. The method according to claim 1 wherein said preceding magnetization inversion data is recorded at a first frequency and said succeeding magnetization inversion data is recorded at a second frequency, said first frequency being different from said second frequency.

9. The method according to claim 1 wherein the step of obtaining a timing includes the steps of providing a start signal and a count to a count setter.

10. The method according to claim 1, wherein said gap detection timer begins measuring time when it detects the ending signal of said preceding magnetization inversion data, and wherein said gap detection timer effects time setting for obtaining said timing every time a time period T corresponding to the time interval of said preceding magnetization inversion data is passed after lapse of a time interval corresponding to the duration of said erasing gap.

* * * * *